UNITED STATES PATENT OFFICE.

ROSARIO TORCHIA, OF NEW YORK, N. Y.

METHOD OF MAKING OXYCHLORID OF MERCURY.

SPECIFICATION forming part of Letters Patent No. 657,325, dated September 4, 1900.

Application filed January 5, 1900. Serial No. 465. (No specimens.)

*To all whom it may concern:*

Be it known that I, ROSARIO TORCHIA, a subject of the King of Italy, residing at New York, (Brooklyn,) in the county of Kings and State of New York, have invented certain new and useful Improvements in Methods of Preparing Oxychlorid of Mercury for Medicinal Purposes, of which the following is a specification.

My invention relates to the process of forming an oxychloride of mercury intended especially for medicinal purposes and wherein the objectionable and dangerous character of corrosive sublimate is eliminated or destroyed, thereby rendering the same practically harmless, and so without materially affecting the known useful and important medicinal and antiseptic qualities.

In order to form oxychloride of mercury by my process, I take four drams of potassa and mix it with eight ounces of water. This mixture is allowed to stand five or six hours and until the undissolved potassa settles on the bottom and the water is very clear. I then take three parts of the mixture, leaving the residuum in the bottom and put this clear fluid in a vessel of terra-cotta and heat to boiling-point. I then add fifteen drams of corrosive mercuric chloride (corrosive sublimate) to the boiling fluid and let boil until all the water or fluid is evaporated. When all the fluid is evaporated, a dark-reddish powder remains in the vessel as the result of my process, and this powder is oxychloride of mercury.

This oxychloride of mercury may be used both as a topical application or as an internal remedy, and is an efficient remedy in cancer, gangrene, diphtheria, and all venereal diseases. If used as a topical remedy, it may be in the form of a salve or a wash. I would consider a mixture of one-half dram of oxychloride of mercury and one-half pint of water as a proper wash. A good salve is made from two drams of oxychloride of mercury mixed with ten drams of pure unsalted lard. If used as an internal remedy, oxychloride of mercury may be in the form of a liquid or pills or tablets. The liquid form for internal use is composed of a mixture of one dram of oxychloride of mercury and one-half pint of water, and I would consider one tablespoonful every morning as a proper dose. Pills are made from two drams of oxychloride of mercury to make about fifteen to twenty pills, and I would consider a proper dose to be one pill every morning, according to the constitution of the patient. A liquid especially useful in diphtheria is made from one-half dram of oxychloride of mercury mixed with four ounces of water.

I claim—

The herein-described method of preparing oxychloride of mercury which consists in mixing at boiling temperature three parts of a saturated solution of potassium hydrate and fifteen parts of corrosive mercuric chloride and evaporating to dryness by boiling, substantially as described.

In testimony whereof I affix my signature in presence of two witnesses.

ROSARIO TORCHIA.

Witnesses:
A. E. H. JOHNSON,
A. ROLAND JOHNSON.